(12) United States Patent
Guo

(10) Patent No.: US 10,585,948 B2
(45) Date of Patent: Mar. 10, 2020

(54) METHOD AND DEVICE FOR CONSTRUCTING SPATIAL INDEX OF MASSIVE POINT CLOUD DATA

(71) Applicant: BEIJING GREENVALLEY TECHNOLOGY CO., LTD., Beijing (CN)

(72) Inventor: Yanming Guo, Beijing (CN)

(73) Assignee: Beijing Greenvalley Technology Co., Ltd., Beijing (CN)

( * ) Notice: Subject to any disclaimer, the term of this patent is extended or adjusted under 35 U.S.C. 154(b) by 266 days.

(21) Appl. No.: 15/377,953

(22) Filed: Dec. 13, 2016

(65) Prior Publication Data

US 2018/0081034 A1    Mar. 22, 2018

(30) Foreign Application Priority Data

Sep. 22, 2016    (CN) .......................... 2016 1 0842204

(51) Int. Cl.
| | | |
|---|---|---|
| *G06F 16/583* | (2019.01) | |
| *G06F 16/901* | (2019.01) | |
| *G06F 16/17* | (2019.01) | |
| *G01S 7/48* | (2006.01) | |
| *G01S 17/89* | (2020.01) | |
| *G01S 17/42* | (2006.01) | |

(52) U.S. Cl.
CPC ...... *G06F 16/9027* (2019.01); *G06F 16/1737* (2019.01); *G06F 16/5854* (2019.01); *G01S 7/4808* (2013.01); *G01S 17/42* (2013.01); *G01S 17/89* (2013.01)

(58) Field of Classification Search
CPC ....... G01S 7/4808; G01S 17/42; G01T 17/00; G06T 17/00; G06T 17/005; G06T 17/20; G06T 9/005; G01C 15/002; G06F 17/30156; G06F 17/30371; G06F 17/30241

See application file for complete search history.

(56) References Cited

U.S. PATENT DOCUMENTS

| | | | |
|---|---|---|---|
| 2005/0203930 A1* | 9/2005 | Bukowski | ......... G06F 17/30241 |
| 2009/0060345 A1* | 3/2009 | Wheeler | .............. G01C 15/002 |
| | | | 382/195 |

(Continued)

FOREIGN PATENT DOCUMENTS

CN    105808672 A    7/2016

OTHER PUBLICATIONS

Zwerman, S; Okun, J, The VES Handbook of Visual Effects, 2014, Focal Press, 2nd Ed., Ch. 7, pp. 20-21 (Year: 2014).*

(Continued)

*Primary Examiner* — James Trujillo
*Assistant Examiner* — Michal Bogacki
(74) *Attorney, Agent, or Firm* — McCarter & English, LLP

(57) ABSTRACT

Embodiments of the present invention disclose a method and device for constructing a spatial index of massive point cloud data. The method includes: partitioning acquired original point cloud data to obtain a plurality of point cloud data blocks; constructing an octree index of a current point cloud data block for each point cloud data block; and merging the octree indexes of the plurality of point cloud data blocks to obtain a spatial index structure of the original point cloud data.

6 Claims, 4 Drawing Sheets

(56) References Cited

U.S. PATENT DOCUMENTS

| | | | | |
|---|---|---|---|---|
| 2013/0156309 A1* | 6/2013 | Yao | ............... | H04N 19/96 |
| | | | | 382/166 |
| 2014/0198097 A1* | 7/2014 | Evans | ............... | G06T 17/00 |
| | | | | 345/419 |
| 2014/0210821 A1* | 7/2014 | Kapoor | ............... | G06T 15/08 |
| | | | | 345/424 |
| 2014/0241617 A1* | 8/2014 | Shotton | ............... | G06K 9/00671 |
| | | | | 382/159 |
| 2015/0092178 A1* | 4/2015 | Debrunner | ............... | G01S 17/89 |
| | | | | 356/4.01 |
| 2016/0239960 A1* | 8/2016 | Byers | ............... | G06T 7/0012 |
| 2016/0275719 A1* | 9/2016 | Oke | ............... | G06T 17/005 |
| 2016/0337441 A1* | 11/2016 | Bloomquist | ............... | G06F 9/5061 |
| 2017/0372137 A1* | 12/2017 | Kumar | ............... | G06K 9/00657 |

OTHER PUBLICATIONS

Office Action dated Jan. 30, 2019, issued in connection with Chinese Application No. 201610842204.9, along with English translation thereof (10 pages).

\* cited by examiner

METHOD AND DEVICE FOR CONSTRUCTING SPATIAL INDEX OF MASSIVE POINT CLOUD DATA

CROSS-REFERENCE TO RELATED APPLICATIONS

This application claims priority to Chinese patent application No. 201610842204.9, filed on Sep. 22, 2016. The contents of that application are hereby incorporated by reference.

TECHNICAL FIELD

Embodiments of the present invention relate to the field of data processing technologies, in particular to a method and device for constructing a spatial index of massive point cloud data.

BACKGROUND

Light Detection and Ranging (LiDAR) is an emerging three-dimensional data acquisition technology, and may rapidly acquire massive point cloud data by using laser scanners carried on a tripod, a car, an aircraft, a satellite and other different platforms. The point cloud data contain latitude/longitude coordinates, intensity, multiple echoes, color and other rich information of each point, and are applied to surveying and mapping, forestry, agriculture, digital city and other fields. At present, common laser scanner equipment, such as Riegl, Faro and Leica, may produce thousands of points per second; number of data points acquired in each scan may reach hundreds of thousands or millions; a volume of data is up to dozens of to hundreds of G. Such a huge volume of data brings a burden to storing and processing of data.

How to effectively organize and manage, dynamically schedule and display massive data is essential to further analysis and application of data; and research in relevant fields is in full swing. Spatial index is a key technology in point cloud data organization and management; different spatial indexing modes have different structural complexities, constructions, query efficiencies and space utilization ratios. At present, common point cloud data spatial indexing modes include grid index, quadtree index, octree index and k-dimensional (KD) tree index. The grid index is easy to construct and code, but no spatial distribution situation of data is considered during construction, and is not conducive to rapid visualization of the point cloud data; the quadtree index is simple in structure, but it is difficult to determine number of points contained in leaf nodes when the quadtree index is constructed for massive point cloud, and construction and query efficiencies are reduced when distribution of data is uneven; the KD tree index is advantageous in query and retrieval of data, but a lot of time is needed to establish a neighborhood relation of points; the octree index is a three-dimensional spatial index structure expanded from the quadtree index to a three-dimensional space, is relatively simple in construction process, and has a high index efficiency; but for massive point cloud data, a larger memory space may be occupied when the index is constructed and query efficiency is also reduced with an increase of depth of an octree.

SUMMARY

Embodiments of the present invention aim to provide a method and device for constructing a spatial index of massive point cloud data, to optimize the existing solution for constructing the spatial index of massive point cloud data.

In one aspect, embodiments of the present invention provide a method for constructing the spatial index of massive point cloud data, including:

partitioning acquired original point cloud data to obtain a plurality of point cloud data blocks;

constructing an octree index of a current point cloud data block for each point cloud data block; and merging octree indexes of the plurality of point cloud data blocks to obtain a spatial index structure of the original point cloud data.

In another aspect, embodiments of the present invention provide a device for constructing the spatial index of massive point cloud data, including:

a partitioning module, configured to partition acquired original point cloud data to obtain a plurality of point cloud data blocks;

an octree index construction module, configured to construct an octree index of a current point cloud data block for each point cloud data block; and a merging module, configured to merge the octree indexes of the plurality of point cloud data blocks to obtain a spatial index structure of the original point cloud data.

According to the solution for constructing the spatial index of massive point cloud data provided by embodiments of the present invention, the acquired original point cloud data are partitioned; the octree index is respectively constructed for each point cloud data block; and then octree indexes of the plurality of point cloud data blocks are merged to obtain the spatial index structure of the original point cloud data. By adopting the above technical solution, a traditional octree index structure is improved; massive point cloud data can be decomposed by partitioning the original point cloud data, to reduce occupation to memory space when constructing the spatial index. In addition, when performing subsequent query after merging the plurality of octree indexes, the octree index where the target data are located can be found first, and then the target data are searched on the basis of the found octree index, so that query efficiency is effectively increased.

DETAILED DESCRIPTION

Figure 1:
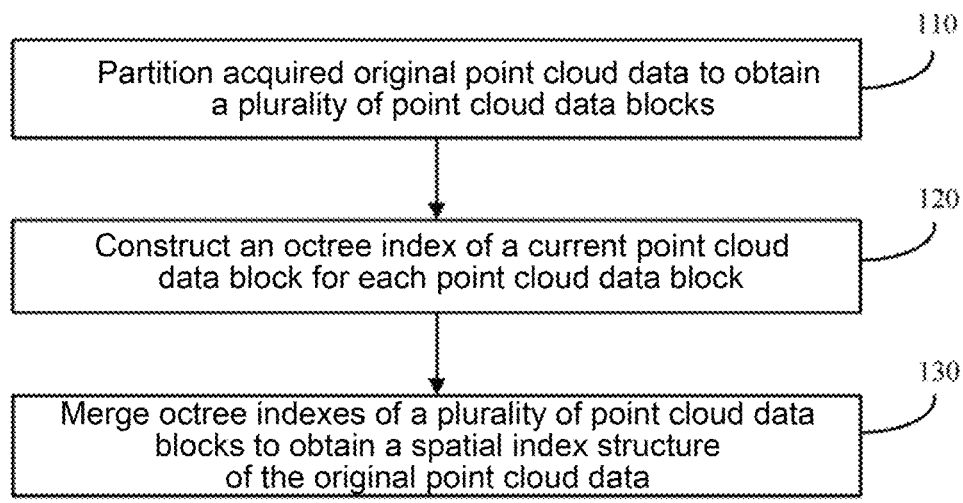
FIG. 1 is a flow chart illustrating a method for constructing a spatial index of massive point cloud data provided by embodiment I of the present invention.

The technical solution of the present disclosure is further described below in combination with drawings and embodiments. It may be understood that embodiments described here are only used for explaining the present disclosure, rather than limiting the present disclosure. Additionally, it should be noted that, in order to facilitate description, relevant parts of structures, rather than all structures, of the present disclosure are shown in the drawings.

It should be noted that some exemplary embodiments are described as processing or methods described by the flow diagrams before the exemplary embodiments are discussed in more details. Although many steps of the flow diagrams are described to be processing in a sequence, many steps there may be implemented in parallel, concomitantly or concurrently. Additionally, the sequence of many steps may be rearranged. The processing may be terminated when an operation is completed, but additional steps excluded into the drawings may also be included. The processing may correspond to a method, a function, a procedure, a subroutine, a sub-program and so on.

Embodiment I

FIG. 1 is a flow chart illustrating a method for constructing a spatial index of massive point cloud data provided by embodiment I of the present invention; the method may be executed by a device for constructing the spatial index of massive point cloud data, where the device may be realized by software and/or hardware and may generally be integrated in a computer or other terminals. As shown in FIG. 1, the method includes following steps.

In step 110, acquired original point cloud data are partitioned to obtain a plurality of point cloud data blocks.

Exemplarily, the acquired original point cloud data may be partitioned according to operation environment information, where the operation environment information may include memory capacity and the like; the memory capacity here may specifically refer to an available memory capacity of a terminal. For example, a volume of data contained in each point cloud data block may be determined according to the available memory capacity; a corresponding amount of point cloud data are read according to the volume of data contained in the point cloud data block to obtain a current point cloud data block when reading the original point cloud data. Assuming that the original point cloud data contain 20 million points, and if it is determined according to the available memory capacity of the terminal that the point cloud data block may contain 5 million points, data corresponding to the 5 million points may be used as the current point cloud data block after reading 5 million points.

In step 120, an octree index of a current point cloud data block is constructed for each point cloud data block.

Exemplarily, the constructing the octree index of the current point cloud data block may include following steps: randomly selecting one point from the current point cloud data block as a root node of an octree; dividing the current point cloud data block in three directions of X, Y and Z, to obtain eight sub-nodes; stopping dividing if number of points contained in certain sub-node is less than a set division threshold, and further dividing the current point cloud data block into eight sub-nodes by using the sub-node as a root node, and so on, so that the octree index of the current point cloud data is constructed; where nodes not divided into eight sub-nodes may be called as leaf nodes; and nodes divided into eight sub-nodes may be called as non-leaf nodes.

Exemplarily, an octree index of each point cloud data block may be created sequentially in the above way, so as to reduce occupation to memory space of the terminal.

In step 130, octree indexes of a plurality of point cloud data blocks are merged to obtain a spatial index structure of the original point cloud data.

Exemplarily, a grid index may be created for the octree indexes of the plurality of point cloud data blocks based on a spatial range of the plurality of point cloud data blocks, to obtain the spatial index structure of the original point cloud data.

Figure 2:
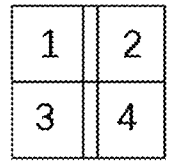
FIG. 2 is a schematic structural diagram illustrating a spatial index provided by embodiment I of the present invention.

Exemplarily, FIG. 2 is a schematic structural diagram illustrating a spatial index provided by embodiment I of the present invention. Original point cloud data are divided into four point cloud data blocks; an octree index of each point cloud data block is constructed respectively, to obtain four octree indexes. When merging the four octree indexes, the grid index may be created based on a spatial range of each point cloud data block, so as to obtain the spatial index structure of the original point cloud data. During a subsequent data query, target data may be found according to corresponding octree indexes only if it is known which part of the four point cloud data blocks the target data to be queried fell on. Compared with one traditional larger octree index constructed according to whole original point cloud data, query efficiency of the spatial index structure constructed in the present embodiment is increased apparently. It should be noted that, as shown in FIG. 2, the four point cloud data blocks may overlap in the spatial range since points are distributed irregularly; and presence or absence of overlap and degree of overlap are not limited specifically in the present embodiment.

According to the method for constructing the spatial index of massive point cloud data provided by embodiment I of the present invention, the acquired original point cloud data are partitioned; the octree index is respectively constructed for each point cloud data block; and then the octree indexes of the plurality of point cloud data blocks are merged to obtain the spatial index structure of the original point cloud data. By adopting the above technical solution, a traditional octree index structure is improved; massive point cloud data can be decomposed by partitioning the original point cloud data, to reduce occupation to memory space when constructing the spatial index. In addition, when performing subsequent query after merging the plurality of octree indexes, the octree index where the target data are located can be found first, and then the target data are searched on the basis of the found octree index, so that query efficiency is effectively increased.

Embodiment II

Figure 3:
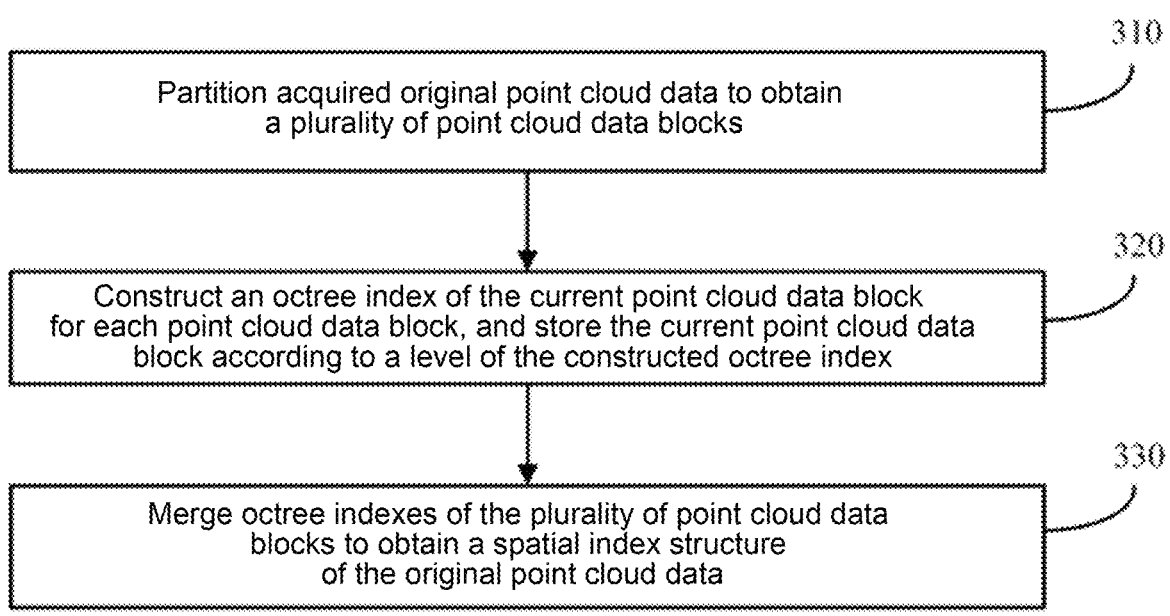
FIG. 3 is a flow chart illustrating a method for constructing a spatial index of massive point cloud data provided by embodiment II of the present invention.

FIG. 3 is a flow chart illustrating a method for constructing a spatial index of massive point cloud data provided by embodiment II of the present invention; the present embodiment is optimized based on the above embodiment. In the present embodiment, the step of constructing an octree index of the current point cloud data block for each point cloud data block is optimized as follows: constructing an octree index of the current point cloud data block for each point cloud data block, and storing the current point cloud data block according to a level of the constructed octree index. For leaf nodes in a current level, all unstored data in a bounding box corresponding to the leaf nodes are stored in the current level; and for non-leaf nodes in the current level, part of the unstored data in the bounding box corresponding to the non-leaf nodes is stored in the current level according to a preset proportion; where a sum of data stored in all levels includes all point cloud data contained in the current point cloud data block.

Correspondingly, the method of the present embodiment includes following steps.

In step 310, acquired original point cloud data are partitioned to obtain a plurality of point cloud data blocks.

In step 320, an octree index of the current point cloud data block is constructed for each point cloud data block, and the current point cloud data block is stored according to the level of the constructed octree index.

For leaf nodes in the current level, all unstored data in the bounding box corresponding to the leaf nodes are stored in the current level; and for non-leaf nodes in the current level, part of the unstored data in the bounding box corresponding to the non-leaf nodes is stored in the current level according to a preset proportion; where a sum of data stored in all levels includes all point cloud data contained in the current point cloud data block.

The bounding box of a node may be interpreted as a cubic space in which all points contained by the node are included. The preset proportion may be different depending on different levels, and the preset proportion of one level may be determined based on a volume of data contained in leaf nodes of the same level.

Figure 4:
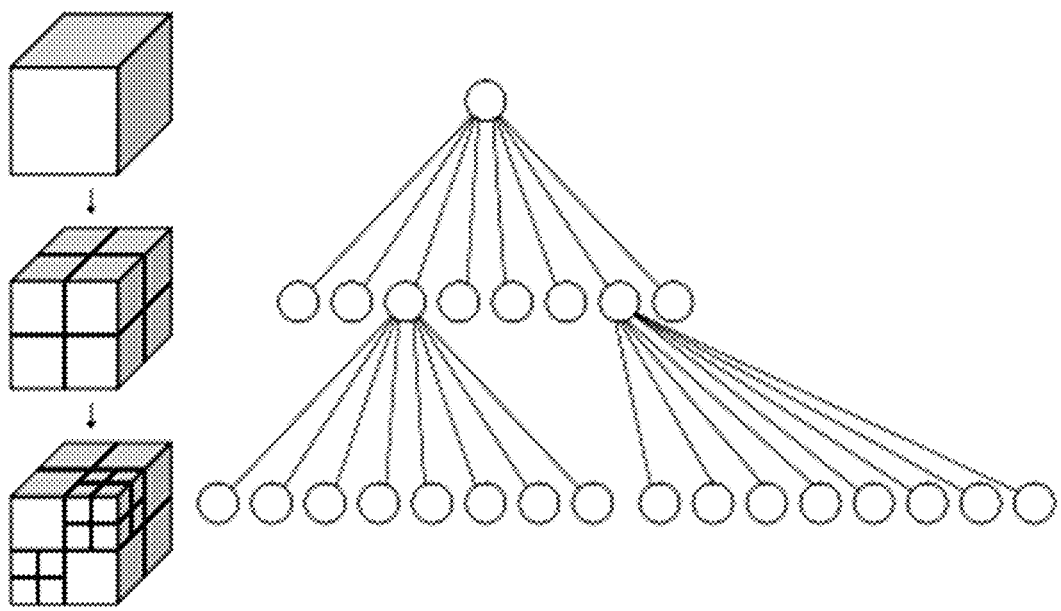
FIG. 4 is a schematic structural diagram illustrating an octree index provided by embodiment II of the present invention.

FIG. 4 is a schematic structural diagram illustrating an octree index provided by embodiment II of the present invention; as shown in FIG. 4, the octree index contains three levels, in which a first level contains the root node of the octree; a third node and a seventh node of the second level are non-leaf nodes, and remaining nodes are leaf nodes; and the third level contains 16 leaf nodes.

In a traditional data storing strategy of octree indexes, same data need to be stored repeatedly, so that a large storing space is occupied. For example, referring to FIG. 4, only two nodes are subdivided into eight sub-nodes, while the other six nodes have no sub-nodes in the second level; but when data storing are performed in the third level, not only data of 16 leaf nodes of the present level need to be stored, but also data of 6 leaf nodes of the second level need to be stored repeatedly, so that size of files is increased.

In the present embodiment, adaptive storing may be performed according to hierarchical depth of the octree. For leaf nodes in the current level, all unstored data in the bounding box corresponding to the leaf nodes are stored in the current level; and for non-leaf nodes in the current level, part of the unstored data in the bounding box corresponding to the non-leaf nodes is stored in the current level according to the preset proportion; where a sum of data stored in all levels includes all point cloud data contained in the current point cloud data block. Referring to FIG. 4, in the first level, the root node is a non-leaf node, all data are in an unstored state at the moment, and part of the data are stored in the first level according to a first preset proportion; in the second level, a first leaf node is taken as an example, part of data in the bounding box corresponding to the leaf node may be randomly extracted and stored by the root node; at the moment, only data remaining in the bounding box corresponding to the leaf node, namely all unstored data, need to be stored; in the second level, a first non-leaf node (a third node) is taken as an example, part of data in the bounding box corresponding to the non-leaf node may be randomly extracted and stored by the root node, and the non-leaf node is divided into eight sub-nodes, so it is necessary to store part of unstored data in the bounding box corresponding to the non-leaf node according to a second preset proportion, and remaining unstored data are left for a next level to store; in the third level, each leaf node stores all unstored data in the corresponding bounding box. In this way, each node in each level may store part of data, and a sum of data stored in all levels includes all point cloud data contained in the current point cloud data block, so that there is no repetitive storing phenomenon and the storing space is effectively saved.

In step 330, octree indexes of the plurality of point cloud data blocks are merged to obtain a spatial index structure of the original point cloud data.

The data storing strategy is optimized in embodiment II of the present invention on the basis of the above embodiment, and data are properly distributed to each level for storing, so as to avoid repetitive storing and effectively save the storing space.

Embodiment III

Figure 5:
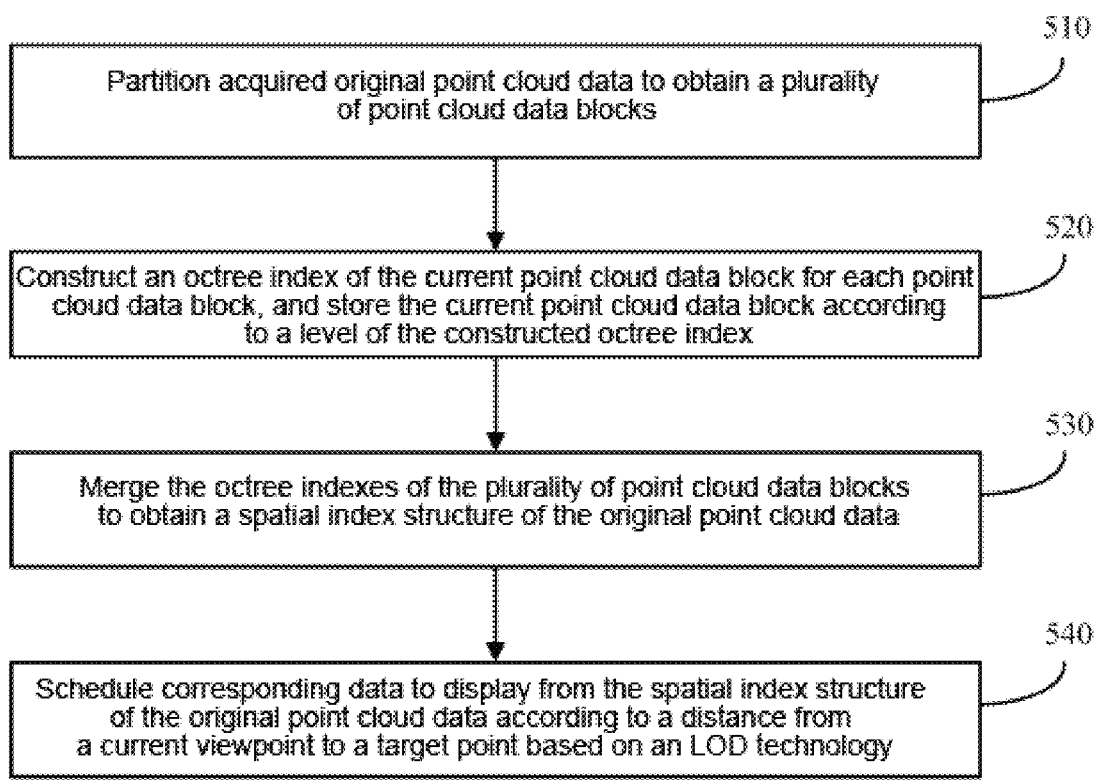
FIG. 5 is a flow chart illustrating a method for constructing a spatial index of massive point cloud data provided by embodiment III of the present invention.

FIG. 5 is a flow chart illustrating a method for constructing a spatial index of massive point cloud data provided by embodiment III of the present invention; the present embodiment is optimized on the basis of the above embodiments. In the present embodiment, after merging the octree indexes of the plurality of point cloud data blocks to obtain the spatial index structure of the original point cloud data, a step of scheduling corresponding data to display from the spatial index structure of the original point cloud data according to a distance from a current viewpoint to a target point based on an Levels of Detail (LOD) technology is added.

Correspondingly, the method of the present embodiment includes following steps.

In step 510, acquired original point cloud data are partitioned to obtain a plurality of point cloud data blocks.

In step 520, an octree index of the current point cloud data block is constructed for each point cloud data block, and the current point cloud data block is stored according to a level of the constructed octree index.

For leaf nodes in a current level, all unstored data in a bounding box corresponding to the leaf nodes are stored in the current level; and for the non-leaf nodes in the current level, part of the unstored data in the bounding box corresponding to the non-leaf nodes are randomly stored in the current level according to a preset proportion; where a sum of data stored in all levels includes all point cloud data contained in the current point cloud data block.

In step 530, the octree indexes of the plurality of point cloud data blocks are merged to obtain the spatial index structure of the original point cloud data.

In step 540, corresponding data are scheduled to display from the spatial index structure of the original point cloud data according to a distance from a current viewpoint to a target point based on the LOD technology.

Exemplarily, a visible scene range is relatively wide when the distance from the current viewpoint to the target point is relatively long; and the visible scene range is relatively small when the distance from the current viewpoint to the target point is relatively short. Coordinates of the scene range may be determined according to size of the visible scene range, and data, corresponding to a point cloud data block or point cloud data blocks and required to be scheduled from the spatial index structure of the original point cloud data, are determined according to coordinates of the scene range.

Figure 6:
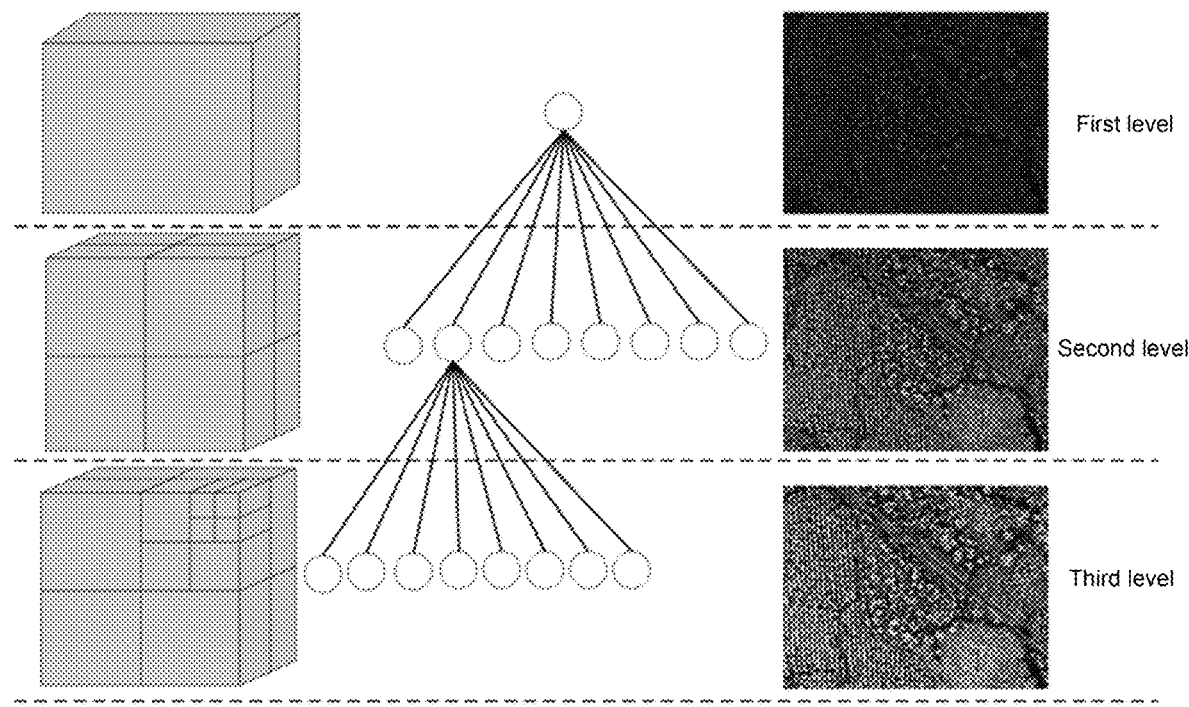
FIG. 6 is a schematic diagram illustrating hierarchical display based on an octree index provided by embodiment III of the present invention.

Exemplarily, to increase speed and efficiency during large-scale scene rendering, not all data are scheduled in most cases but part of the data are thinned according to different viewpoints. The LOD technology refers to a rendering operation for determining resource allocation of object rendering according to location and importance of nodes of an object model in a display environment so as to reduce number of sides and LOD of non-important objects and obtain high efficiency. FIG. 6 is a schematic diagram illustrating hierarchical display based on an octree index provided by embodiment III of the present invention; as shown in the figure, the octree index contains three levels including a first level (Level 1), a second level (Level 2) and a third level (Level 3); the greater the level number, the denser the points, and the more detail information displayed.

When scheduling the original point cloud data, point cloud data blocks required to be scheduled from the spatial index structure of the original point cloud data may be determined according to the distance from the current viewpoint to the target point, and then data corresponding to the appropriate level are scheduled from the octree index of the determined point cloud data block based on the LOD technology according to requirements on detail information.

According to the method for constructing the spatial index of the massive point cloud data provided by embodiment III of the present invention, hierarchical display is performed on the basis of the LOD technology after completing construction of the spatial index structure of the original point cloud data, so that real-time visualization of the point cloud data can be realized and it is facilitated for following edition of point cloud data. In order to verify effectiveness and high efficiency of the method provided by embodiments, spatial indexes are constructed by taking point cloud data with capacity of 42.1 GB acquired by an unmanned aerial vehicle (UAV) laser scanner as test data, where time for constructing the indexes is 1.5 hours, and data volume after constructing the indexes is 36.1 GB. A configuration of a computer processor for a test is Intel® Core™ i5-4460 CPU @ 3.2 GHz; test results show that the method can manage massive point cloud data well and can perform dynamically scheduling, displaying and editing. Data can be opened in less than a second after constructing the indexes, so that time is greatly saved.

Embodiment IV

Figure 7:
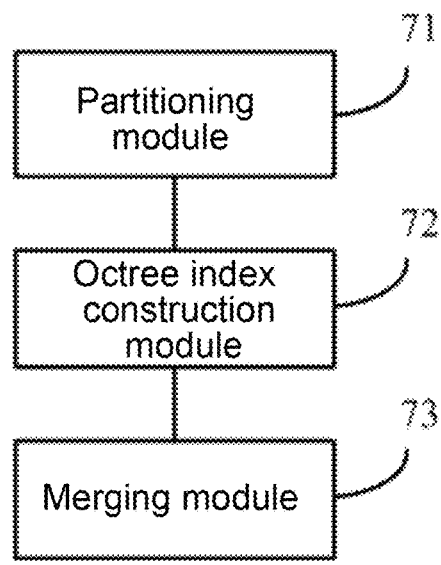
FIG. 7 is a structural block diagram illustrating a device for constructing a spatial index of massive point cloud data provided by embodiment IV of the present invention.

FIG. 7 is a structural block diagram illustrating a device for constructing a spatial index of massive point cloud data provided by embodiment IV of the present invention, where the device may be realized by software and/or hardware, and is generally integrated in a computer and other terminals, and may construct the spatial index of point cloud data by executing the method for constructing the spatial index of massive point cloud data. As shown in FIG. 7, the device includes a partitioning module 71, an octree index construction module 72 and a merging module 73.

The partitioning module 71 is configured to partition acquired original point cloud data to obtain a plurality of point cloud data blocks; the octree index construction module 72 is configured to construct an octree index of a current point cloud data block for each point cloud data block; and the merging module 73 is configured to merge the octree indexes of the plurality of point cloud data blocks to obtain a spatial index structure of the original point cloud data.

The device for constructing the spatial index of massive point cloud data provided by embodiment IV of the present invention improves a traditional octree index structure, and can decompose massive point cloud data by partitioning the original point cloud data, to reduce occupation to memory space when constructing the spatial index. In addition, an octree indexes where target data are located can be found first during subsequent query after merging the plurality of octree indexes, and target data are searched on the basis of the found octree indexes, to effectively increase query efficiency.

Based on above embodiments, the octree index construction module is specifically configured to construct the octree index of the current point cloud data block for each point cloud data block, and store the current point cloud data block according to a level of the constructed octree index; where for leaf nodes in a current level, all unstored data in a bounding box corresponding to the leaf nodes are stored in the current level; and for non-leaf nodes in the current level, part of the unstored data in the bounding box corresponding to the non-leaf nodes are randomly stored in the current level according to a preset proportion; and a sum of data stored in all levels includes all point cloud data contained in the current point cloud data block.

Based on above embodiments, the partitioning module is specifically configured to partition the acquired original point cloud data according to operation environment information to obtain a plurality of point cloud data blocks, where the operation environment information includes a memory capacity.

Based on above embodiments, the merging module is specifically configured to create a grid index for the octree indexes of the plurality of point cloud data blocks based on a spatial range of the plurality of point cloud data blocks, to obtain the spatial index structure of the original point cloud data.

Based on above embodiments, the device further includes a scheduling module which is configured to schedule corresponding data to display from the spatial index structure of the original point cloud data according to a distance from a current viewpoint to a target point based on an LOD technology after merging the octree indexes of the plurality of point cloud data blocks to obtain the spatial index structure of the original point cloud data.

Embodiment V

Embodiments of the present invention further provide a storing medium containing a computer-executable instruction, which is configured to execute the method for constructing the spatial index of the point cloud data when being executed by a computer processor; where the method includes:

partitioning acquired original point cloud data to obtain a plurality of point cloud data blocks; constructing an octree index of the current point cloud data block for each point cloud data block; and merging the octree indexes of a plurality of point cloud data blocks to obtain a spatial index structure of the original point cloud data.

Optionally, the computer-executable instruction may also be configured to executing the technical solution of the method for constructing the spatial index of massive point cloud data provided by any embodiment of the present invention when being executed by the computer processor.

Through the above description of the implementation manners, those skilled in the art may clearly understand that the present disclosure may be realized by the aid of software and necessary universal hardware, or through hardware certainly, but the former is an implementation manner in most situations. On the basis of such understanding, the technical solution of the present disclosure may be embodied in the form of a software product in essence or in a part contributing the existing art, and the computer software product may be stored in a computer-readable storing medium, such as a floppy disk, an ROM (Read-Only Memory), an RAM (Random Access Memory), a FLASH, a hard disk or an optical disk, including several instructions for enabling a computer device (which may be a personal computer, a server or a network device and the like) to execute the method of each embodiment of the present invention.

Embodiment VI

Embodiment VI of the present invention provides a terminal, including the device for constructing the spatial index of massive point cloud data provided by any embodiment of the present invention.

Figure 8:
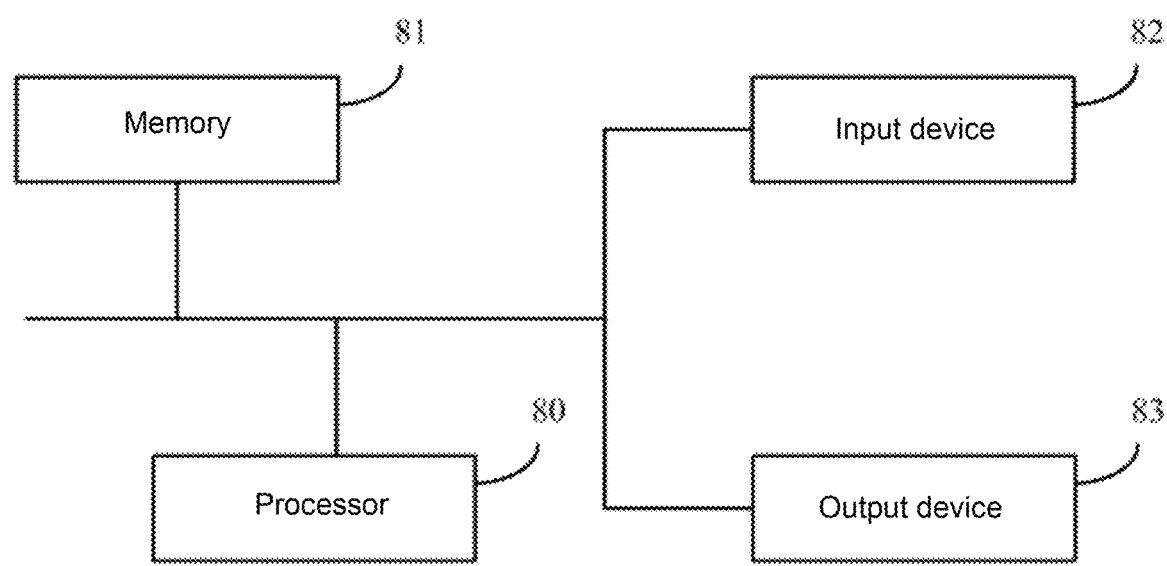
FIG. 8 is a structural block diagram illustrating a terminal provided by embodiment VI of the present invention.

Specifically, FIG. 8 is a structural block diagram illustrating a terminal provided by embodiment VI of the present invention; as shown in FIG. 8, the present embodiment of the present invention provides the terminal, where the terminal includes one or more processors 80, a memory 81, an input device 82 and an output device 83; one processor 80 is taken as an example in FIG. 8; the processor 80, the memory 81, the input device 82 and the output device 83 in the terminal may be connected with each other by a bus or in other ways, and the connection realized by the bus is taken as an example in FIG. 8.

The memory 81, as a computer-readable storing medium, may be configured to storing a software program, a computer-executable program and modules, such as program instructions/modules (such as the partitioning module 71, the octree index construction module 72 and the merging module 73 in the device for constructing the spatial index of massive point cloud data) corresponding to the method for constructing the spatial index of massive point cloud data in embodiments of the present invention. The processor 80 may execute a variety of function applications of the terminal and data processing by running the software program, the instructions and the modules stored in the memory 81, namely, the above method for constructing the spatial index of massive point cloud data is realized.

The memory 81 may mainly include a program storing area and a data storing area, where the program storing area may be configured to storing an operation system and at least one APP required by the functions; the data storing area may be configured to storing data and the like established according to the use of the terminal. Additionally, the memory 81 may include a high-speed RAM and may also include a non-transitory memory, such as at least one disk storing device, a flash device or other non-transitory solid storing devices. In some embodiments, the memory 81 optionally includes memories arranged remotely relative to the processor 80, and the remote memories may be connected to the terminal through a network. The example of the above network includes but not limited to Internet, Intranet, LAN (Local Area Network), a mobile communication network and a combination thereof.

The input device 82 may be configured to receiving input digit or character information and generating key signal input related to user setting and function control of the terminal. The output device 83 may include a display screen and other display devices.

The device for constructing the spatial index of massive point cloud data, the storing medium and the terminal provided by embodiments may execute the method for constructing the spatial index of massive point cloud data provided by any embodiment of the present invention, and have corresponding functional modules and beneficial effects to execute the method. Technical details not described in detail in embodiments IV-VI may refer to the method for constructing the spatial index of massive point cloud data provided by any embodiment (e.g. embodiment I, II, or III) of the present invention.

It should be noted that the above contents are only embodiments and the applied technical principles of the present disclosure. Those skilled in the art may understand that the present disclosure is not limited to the specific embodiments described here, and may perform various obvious changes, readjustments and substitutions without departing from the protection scope of the present disclosure. Therefore, although the present disclosure is described in more detail through the above embodiments, the present disclosure is not only limited to the above embodiments and may also include more other equivalent embodiments without departing from the conception of the present disclosure, while the scope of the present disclosure is decided by the scope of appended claims.

What is claimed is:

1. A method for constructing a spatial index of massive point cloud data, comprising:
    partitioning, by a processor of a terminal, acquired original point cloud data to obtain a plurality of point cloud data blocks;
    constructing, by the processor, an octree index of a current point cloud data block for each point cloud data block, and storing the current point cloud data block according to a level of the constructed octree index; wherein storing the current point cloud data block comprises for a bounding box corresponding to any one of leaf nodes of a current level, storing all data that have not been stored, and for a bounding box corresponding to any one of non-leaf nodes of the current level, storing a preset proportion of data that have not been stored, wherein a value of the preset proportion is less than 1 and greater than 0; and wherein a sum of data stored in all levels comprises all point cloud data which are contained in the current point cloud data block;
    merging, by the processor, octree indexes of the plurality of point cloud data blocks to obtain a spatial index structure of the acquired original point cloud data; and
    scheduling, by the processor, corresponding data to display from the spatial index structure of the acquired original point cloud data according to a distance from a current viewpoint to a target point based on a Levels of Detail (LOD) technology.

2. The method according to claim 1, wherein the partitioning, by a processor of a terminal, acquired original point cloud data to obtain a plurality of point cloud data blocks, comprises:
    partitioning, by the processor, the acquired original point cloud data according to operation environment information to obtain the plurality of point cloud data blocks, wherein the operation environment information comprises a memory capacity.

3. The method according to claim 1, wherein the merging, by the processor, octree indexes of the plurality of point cloud data blocks to obtain a spatial index structure of the acquired original point cloud data, comprises:
    creating, by the processor, a grid index for the octree indexes of the plurality of point cloud data blocks based on a spatial range of the plurality of point cloud data blocks, to obtain the spatial index structure of the acquired original point cloud data.

4. A device for constructing a spatial index of massive point cloud data, comprising a processor and a storage device, wherein the storage device stores processor-executable programs, and the programs comprise:
- a partitioning module, configured to partition acquired original point cloud data to obtain a plurality of point cloud data blocks;
- an octree index construction module, configured to construct an octree index of a current point cloud data block for each point cloud data block and store the current point cloud data block according to a level of the constructed octree index; wherein storing the current point cloud data block comprises for a bounding box corresponding to any one of leaf nodes of a current level, storing all data that have not been stored, and for a bounding box corresponding to any one of non-leaf nodes of the current level, storing a preset proportion of data that have not been stored, wherein a value of the preset proportion is less than 1 and greater than 0; and wherein a sum of data stored in all levels comprises all point cloud data which are contained in the current point cloud data block;
- a merging module, configured to merge the octree indexes of the plurality of point cloud data blocks to obtain a spatial index structure of the acquired original point cloud data; and
- a scheduling module, configured to schedule corresponding data to display from the spatial index structure of the acquired original point cloud data according to a distance from a current viewpoint to a target point based on a Levels of Detail (LOD) technology after the merging of the octree indexes of the plurality of point cloud data blocks to obtain the spatial index structure of the acquired original point cloud data.

5. The device according to claim 4, wherein the partitioning module is specifically configured to:
   partition the acquired original point cloud data according to operation environment information to obtain the plurality of point cloud data blocks, wherein the operation environment information comprises a memory capacity.

6. The device according to claim 4, wherein the merging module is specifically configured to:
   create a grid index for the octree indexes of the plurality of point cloud data blocks based on a spatial range of the plurality of point cloud data blocks, to obtain the spatial index structure of the acquired original point cloud data.

* * * * *